Aug. 4, 1959 M. R. McELROY 2,898,479

CLOCK PULSE CIRCUIT FOR TRANSISTOR FLIP-FLOP

Filed June 28, 1957

| J | K | Q | Q̄ |
|---|---|---|---|
| +1V | +1V | NO CHANGE | NO CHANGE |
| −1V | +1V | T | F |
| +1V | −1V | F | T |
| −1V | −1V | CHANGES STATE | CHANGES STATE |

INVENTOR.
MELVIN R. McELROY,
BY
F. Morris Redman
ATTORNEY.

2,898,479

CLOCK PULSE CIRCUIT FOR TRANSISTOR FLIP-FLOP

Melvin R. McElroy, Redondo Beach, Calif., assignor to Hughes Aircraft Company, Culver City, Calif., a corporation of Delaware Application June 28, 1957, Serial No. 668,684

3 Claims. (Cl. 307—88.5)

Figures 1, 2:
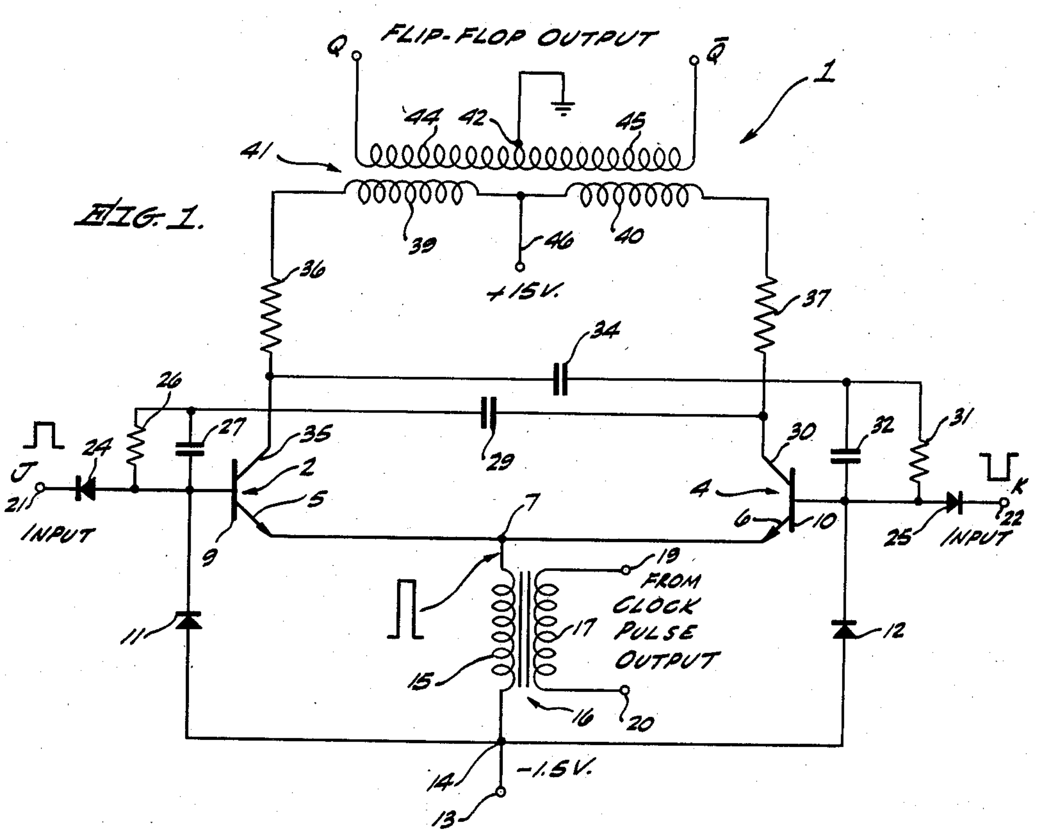

This invention relates to multivibrators, and particularly to an improvement in transistor multivibrators.

The advantage lies in introducing the clock pulse to the common emitter circuit in such a way that its effect on the flip-flop is determined by the condition of the two inputs, J and K. This has been found to be possible because of the characteristics of the transistor as a current device, with low impedance from the base to the emitter.

Multivibrator circuits using either vacuum tubes or transistors are well known in the art and may be operated in a stable, monostable, or bistable conditions. Commonly used circuits for transistor flip-flops are described by R. F. Shea in his book, "Principles of Transistor Circuits," published by John Wiley & Sons, New York, in 1954, pages 289 and 299. Another transistor flip-flop currently used employing point contact transistors is shown and described in the Air Force Cambridge Research Center Technical Report 53–16, by A. W. Carlson, entitled, "High Speed Transistor Flip-Flops," published in June 1953. See also chapter 12 on "Pulse Circuits," in "Transistor Electronics," by Lo, Endres, Zawels, Waldhauer and Cheng, published by Prentice Hall in 1955, particularly at pp. 469, 470, relating to Figs. 12–37. In this text figure, a simplified twin-transistor bistable circuit is shown, on which the present invention is an improvement. Lock-in is effected in the Figs. 12–37 circuit solely by a common emitter resistance $R_e$. The arrival of a negative pulse at the common emitter junction turns off both units momentarily. The collector voltage of the "on" unit next undergoes a sudden change to a more negative value. This change of voltage sends a negative pulse through the cross-coupling capacitor to the base of the "off" unit and turns that unit on. Thus, the "on" and "off" units remain reversed in the circuit until the arrival of the next input pulse.

In the known transistor flip-flops, several difficulties arise where direct coupling to a load is employed. Most important, is the difficulty of matching the output impedance to the load impedance, which is desirable to obtain the optimum transfer of power. If there is an impedance mis-match, a large amount of current may flow through the semi-conductor body of the transistor, which causes a reduction in sensitivity to the applied input pulses which may be utilized for triggering the flip-flop. This necessitates the use of a larger amount of power in the triggering pulses to obtain proper flip-flop operation. This difficulty is overcome in the instant disclosure in part through the use of a proper output transformer.

Another requirement of prior art circuits such as that described in the pending application of Danial L. Curtis, S.N. 547,830, filed November 18, 1955, for "Logical Decision Circuitry for Digital Computers," assigned to assignee of the present invention, has been that the clock was required to pull down the full current output of the flip-flops, which might run as high as 800 milliamperes each. This current requirement was so great that no satisfactory clock pulse circuit was ever developed to deal with it.

An alternative prior art scheme using low pulse currents was described in the pending application of Glenn J. Wilcox and Eugene M. Rector, Serial No. 575,545, filed April 2, 1956, entitled, "Clock Pulse Insertion Circuit." The present invention represents an improvement over such a scheme in that the special and expensive clock pulse transformer there required is eliminated.

The primary object of this invention is thus to improve the method of triggering transistor flip-flop circuits.

Another object is to reduce the power requirements of triggering circuits associated with transistor flip-flops.

A still further object is to increase the number of associated circuit units which can be triggered by a single flip-flop.

These and other objects will be apparent from the detailed description following in connection with the drawings in which:

Fig. 1 represents a schematic circuit diagram of an arrangement for practicing the invention; and Fig. 2 is a truth table applicable to the circuit of Fig. 1.

Referring now to Fig. 1, the invention as shown is embodied in a flip-flop circuitry generally indicated as 1 which has a pair of transistors 2 and 4. The emitters 5 and 6 of transistors 2 and 4, respectively, are connected together and brought to a common emitter point 7. The bases 9 and 10 are connected through back-to-back diodes 11 and 12, respectively, to a common base circuit point 14, which receives a negative bias from a conventional source, not shown, through terminal 13. The common emitter point 7 and the common base point 14 are connected together through the secondary 15 of a clock pulse transformer indicated generally as 16. The primary 17 of transformer 16 is supplied with a clock pulse input through circuitry represented generally by the terminals 19 and 20. The bases 9 and 10 receive inputs from a J terminal 21 and a K terminal 22 through diodes 24 and 25, respectively. Base 9 is also connected through a first network comprising a base current feedback resistor 26 and a capacitor 27 in parallel, and through a coupling capacitance 29 to the collector 30 of the other transistor 4. A second and similar network consisting of a base current feedback resistor 31 and a capacitance 32 is cross-connected through a coupling capacitance 34 to the collector of transistor 2.

The collectors 35 and 30 are fed through collector current limting resistors 36 and 37, respectively, from the split primaries 39 and 40 of a flip-flop output transformer 41. The secondary of the flip-flop output transformer 41 has a grounded center tap 42 which divides it into a Q output half 44 and a $\bar{Q}$ output half 45. The common point 46 between the primaries 39 and 40 is connected to a suitable potential source not shown which, in the particular embodiment illustrated, was +15 volts.

Assume that the J input 21 and the K input 22 are at +1 volt and −1 volt, respectively, and that transistor 2 is cut off while transistor 4 is conducting. The potentials of the bases 9 and 10 will be around −2 volts and −1.3 volts, respectively. At clock pulse time, the common emitter point 7 will be raised from −1.5 to +.5 volt. The base 9 of transistor 2 stays essentially constant, since current is flowing in diode 11 and the emitter 5 of transistor 2 is back biased. This only tends to cut off transistor 2, since it is already cut off. The base 10 of transistor 4 is approximately 0.2 volt above the emitter 6 and remains at this value when the base 10 is forward biased, due to the clamping action of emitter 6. The base 10 of transistor 4 follows the emitter as it is being raised by the clock pulse. The base 10 of transistor 4 will follow the emitter 6 until it reaches a $-1$ volt potential, because the $-1$ volt potential of the K input 22 clamps to prevent the base from going more positive. However, the emitter 6 continues to go positive until it reaches $+0.5$ volt, and at this point, the base 10 of transistor 4 is $-1$ volt and the emitter 6 is at $+0.5$ volt which cuts off transistor 4 and flips the flip-flop.

When both J and K are positive, the flip-flop will not flip, because the conducting base follows the emitter upward at clock pulse time and remains forward biased. In the embodiment illustrated in Fig. 1, there will be a very small change in base current through the base 10 of the conducting transistor 4 but not enough to flip the flip-flop. The base currents are supplied through resistors 26 and 31 and the forward resistance of emitter diodes to $-1.5$ volts. The $-1.5$ volt emitter potential changes 2 volts. Thus, the base current would change by 2/16.5 of its steady state value during clock pulse time. Under the conditions shown in Fig. 1, with J at $-1$ volt and K at $+1$ volt, the flip-flop circuit 1 will not flip because the K base 10 follows the emitter 6. Thus, the flip-flop obeys the truth table as shown in Fig. 2.

The transistors 2 and 4 are shown as NPN's. If PNP's are used and diodes 24, 25, 11 and 12 are reversed in polarity, a negative clock could be introduced at the emitters and the same truth table would apply except J and K polarities would be reversed.

The advantage of this arrangement is that it requires a small amount of clock pulse current. In the circuitry shown in Fig. 1, only the collector current and the base current, which is approximately 3 mils, need be supplied by the clock pulse. If a safety factor is added, and 4 mils are provided for each flip-flop, then the total power required for 50 flip-flops would be only 200 mils. This represents an entirely different order of magnitude from that power required in the Curtis disclosure referred to above. In that arrangement, around 200 mils per flip-flop are needed if the output is loaded to its maximum capabilities. For 50 flip-flops, 10 amperes of clock pulse current would be required.

Thus, the present invention provides an arrangement in which the state of the flip-flop depends on the input potentials when the clock pulse is introduced at the common emitters. The circuitry shown provides vastly increased sensitivity, and a corresponding reduction in power requirements to a lower order of magnitude. The reduction in power offers, as will be appreciated by those skilled in the art, a great simplification in the design of computer arrangement, since it reduces the need for spacing the components and providing special cooling means.

What is claimed is:

1. In a transistor flip-flop circuit comprising: first and second transistors each having a base, a collector, and an emitter; means having a first diode for applying a J input signal to the base of the first of said transistors; means having a second diode for applying a K input signal to the base of the second said transistors; means for connecting the emitters of said first and second transistors back-to-back to define a common emitter point; means comprising back-to-back diodes for connecting the bases of said first and second transistors together to define a common base point; means for applying a negative bias to said common base point; a clock pulse transformer having a primary winding and a secondary winding, said primary winding being arranged to receive clock pulse inputs, and said secondary winding being connected between said common base and emitter points; network means including parallel resistance and capacitance elements in series with a coupling capacitance, for connecting the base of each of said transistors to the collector means of the other of said transistors; an output resistor connected between each of said collectors and the split primaries of a flip-flop output transformer having Q and $\bar{Q}$ output secondary terminals; means for feeding base current to each of said transistors from a power supply associated with the flip-flop output circuit; and means for energizing said flip-flop output transformer from said power supply associated therewith under the selective control of one or both of said J or K input signals.

2. A transistor flip-flop circuit comprising: first and second transistors, each having a base, a collector and an emitter; means including a first diode for applying a J input signal to the base of the first of said transistors; means including a second diode for applying a K input signal of polarity opposite to that of said J signal to the base of the second of said transistors; means for connecting the emitters of said first and second transistors together to define a common emitter point; means having back-to-back diodes for connecting the bases of said first and second transistors together to define a common base point; means for negatively biasing said common base point; a clock pulse transformer having a primary winding and a secondary winding, said primary winding being arranged to receive clock pulse inputs, and said secondary winding being connected between said common base and emitter points; an output transformer having a split primary winding connected to each of said collectors and having a common point connected to a direct current power source and having a split secondary winding grounded at an intermediate point and arranged to deliver output signals of opposite polarity at the ends thereof, said J and K inputs being arranged to control the passage of said clock pulse input signals.

3. A transistor flip-flop circuit comprising: first and second transistors, each having a base, a collector and an emitter; means having a first diode for applying a J input signal to the base of the first of said transistors; means having a second diode for applying a K input signal of polarity opposite to that of said J signal to the base of the second of said transistors; means for connecting the emitters of said first and second transistors together to define a common emitter point; means having back-to-back diodes for connecting the bases of said first and second transistors together to define a common base point; means for providing a reverse bias across each of said back-to-back diodes for maintaining said diodes in a non-conductive state until the potential at the base of each of said transistors is sufficient to overcome said bias; means for negatively biasing said common base point; a clock pulse transformer having a primary winding and a secondary winding, said primary winding being arranged to receive clock pulse inputs, and said secondary winding being connected between said common base and emitter points; an output transformer having a split primary winding connected to each of said collectors and having a common point connected to a direct current power source and having a split secondary winding grounded at an intermediate point and arranged to deliver output signals of opposite polarity at the ends thereof, said J and K inputs being arranged to control the passage of said clock pulse input signals.

References Cited in the file of this patent

UNITED STATES PATENTS

| | | |
|---|---|---|
| 2,665,845 | Trent | Jan. 12, 1954 |
| 2,673,936 | Harris | Mar. 30, 1954 |
| 2,759,104 | Skellett | Aug. 14, 1956 |
| 2,764,343 | Diener | Sept. 25, 1956 |
| 2,778,978 | Drew | Jan. 22, 1957 |
| 2,783,384 | Bright et al. | Feb. 26, 1957 |
| 2,797,261 | Polyzou | June 25, 1957 |
| 2,802,940 | Burton | Aug. 13, 1957 |